United States Patent [19]

Eats et al.

[11] Patent Number: 4,609,840

[45] Date of Patent: Sep. 2, 1986

[54] BAFFLE FOR IMPROVING COOLANT GAS FLOW DISTRIBUTION IN THE GAP REGION OF A GAS COOLED DYNAMOELECTRIC MACHINE

[75] Inventors: James V. Eats, Albany; Norman J. Lipstein, Schenectady; Edward H. Miller, Rexford, all of N.Y.

[73] Assignee: General Electric Company, Schenectady, N.Y.

[21] Appl. No.: 668,239

[22] Filed: Nov. 5, 1984

[51] Int. Cl.$^4$ .............................................. H02K 9/00
[52] U.S. Cl. ........................................ 310/58; 310/55; 310/254
[58] Field of Search .................. 310/58, 59, 60 R, 61, 310/62, 63, 52, 53, 55, 64, 65, 256, 42, 254; 29/296

[56] References Cited

U.S. PATENT DOCUMENTS

| | | | |
|---|---|---|---|
| 3,163,789 | 12/1964 | Rosenberg | 310/53 |
| 3,413,499 | 11/1968 | Barton | 310/58 |
| 3,714,477 | 1/1973 | Gott | 310/256 |
| 4,051,400 | 9/1977 | Armor et al. | 310/58 |
| 4,264,834 | 4/1981 | Armor et al. | 310/59 |
| 4,379,975 | 4/1983 | Kitajima | 310/59 |

FOREIGN PATENT DOCUMENTS

| | | | |
|---|---|---|---|
| 0110406 | 8/1979 | Japan | 310/58 |
| 1106989 | 3/1968 | United Kingdom . | |
| 1240791 | 7/1971 | United Kingdom . | |
| 1356463 | 6/1974 | United Kingdom . | |
| 1489700 | 10/1977 | United Kingdom . | |

*Primary Examiner*—R. Skudy
*Attorney, Agent, or Firm*—Paul Checkovich; Jerome C. Squillaro

[57] ABSTRACT

A baffle for improving coolant gas flow distribution in the gap region of a gas cooled dynamoelectric comprises a perforate member defining at least one gas flow path therethrough. The baffle preferably is spaced from the arcuately surrounds the rotor of the generator, wherein the gas flow path provides communication between the end space region and gap region of the generator. The member may define a plurality of gas flow paths disposed in a predetermined array. Gas exiting the gas flow paths may be directed from substantially parallel to the axis of rotation of the generator to an outwardly radial angle of about 30° with respect to the axis of rotation. The size, spacing and disposition of the gas flow paths are coordinated with circumferential gas flow paths around the baffle to provide rapidly radially diffused coolant gas flow downstream the baffle, thus ensuring adequate coolant gas flow to stator core coolant ducts of the generator.

47 Claims, 6 Drawing Figures

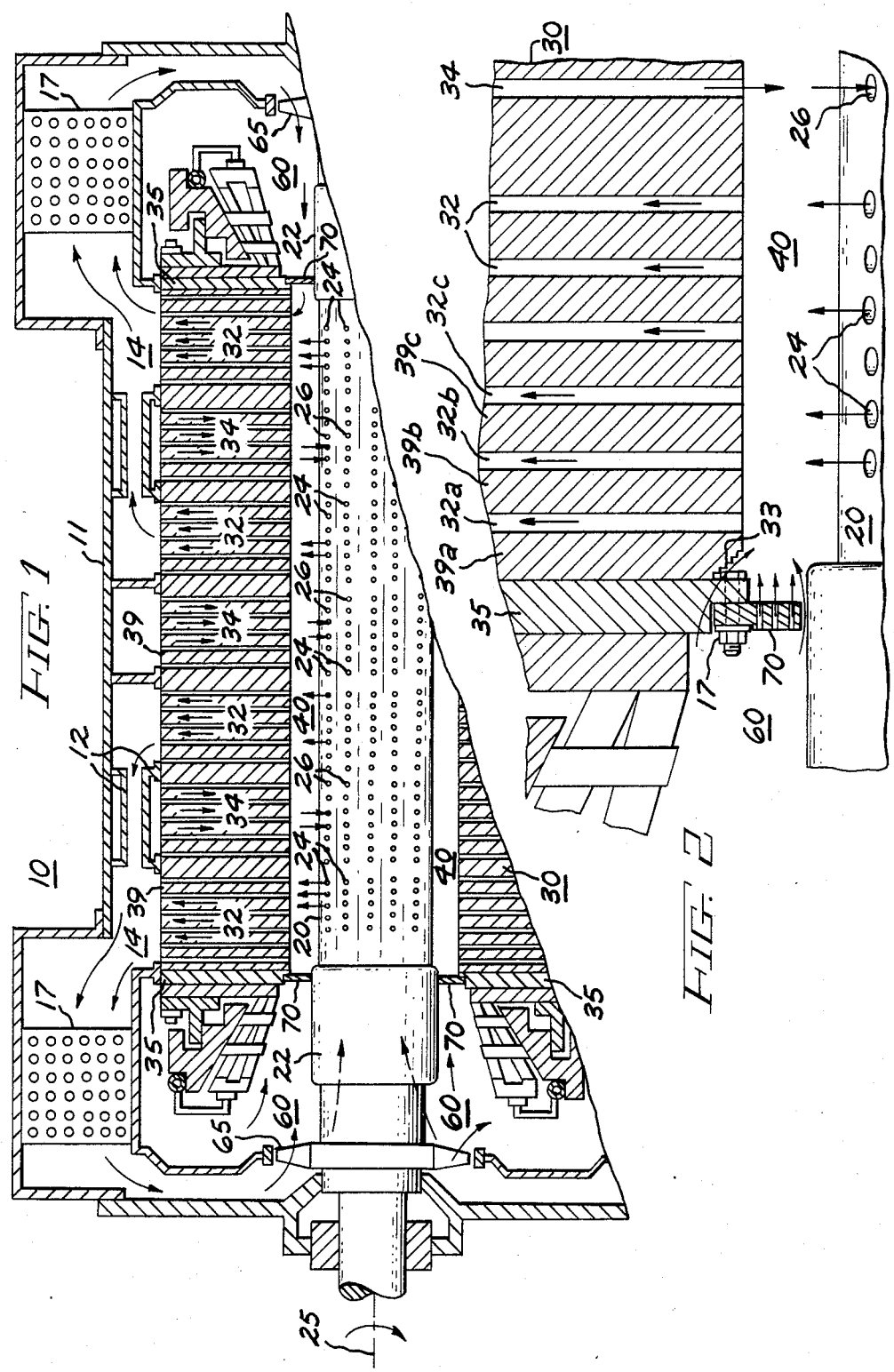

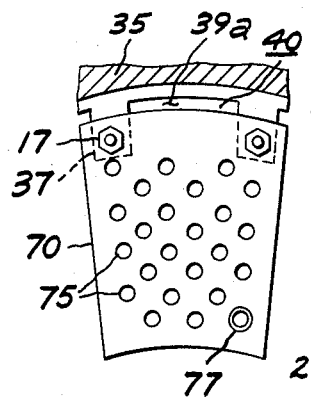
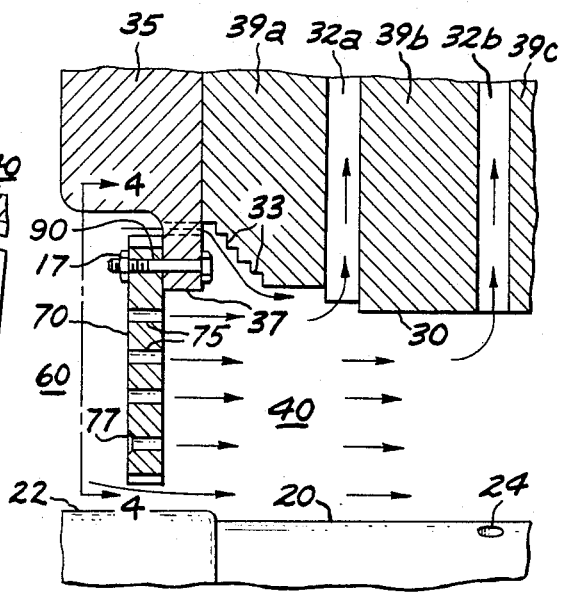
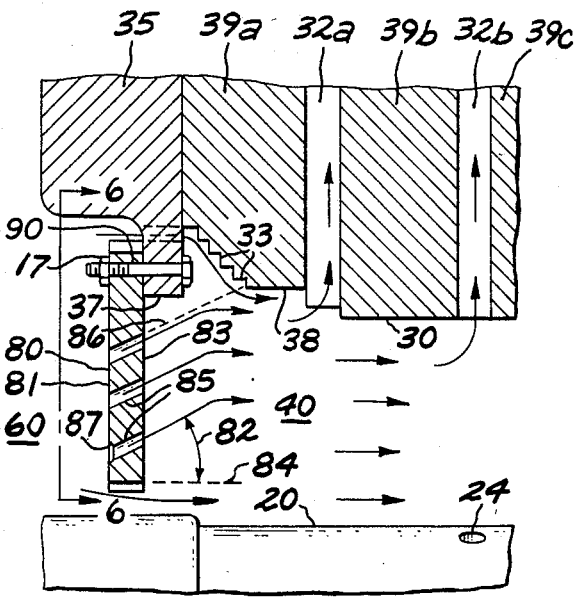

BAFFLE FOR IMPROVING COOLANT GAS FLOW DISTRIBUTION IN THE GAP REGION OF A GAS COOLED DYNAMOELECTRIC MACHINE

BACKGROUND OF THE INVENTION

This invention relates to improving coolant gas flow distribution in the gap region of a gas cooled dynamoelectric machine and, more particularly, to a baffle for improving coolant gas flow to stator ventilating ducts disposed in gas flow communication with the gap region downstream the baffle.

Although this invention may be especially applicable to hydrogen cooled dynamoelectric machines, such as large turbine generators which may have ratings of 300 KW or more, since these machines typically produce more heat that must be dissipated than lower rated machines, it is generally applicable to any gas cooled machine, such as one which uses air for coolant gas. Throughout this specification and claims appended hereto, words of physical relationship such as radial, axial, tangential, circumferential, etc., and their derivatives, are to be taken with respect to the axis of rotation of the rotor of the machine, unless otherwise noted.

A typical gas cooled dynamoelectric machine includes a rotatably mounted rotor having a stator spaced from and circumferentially surrounding the rotor. The space between the rotor and the stator of the machine is referred to generally as the gap region. The stator includes a plurality of axially stacked metal laminations separated at predetermined intervals by respective circumferentially extending stator core ventilating ducts in gas flow communication with the gap region. Toward axial ends of the machine, a fan, or other gas impelling device, is connected to the rotor to force coolant gas from the end space region of the machine into the gap region while the rotor is rotating, ultimately to flow through stator core ventilating ducts.

There may be a limited flow of coolant gas available, and thus it is desirable to limit flow of coolant gas into the gap region so that sufficient coolant gas is available for other coolant paths in the generator, while ensuring an adequate amount of coolant gas for each stator core ventilating duct. A known baffle configuration exhibits a solid profile to the flow of coolant gas and is connected to an axial end of the stator. The solid baffle radially extends into the gap region and is spaced from and circumferentially surrounds the rotor. The circumferential flow area for coolant gas between the rotor and the radially inner margin of the baffle is reduced relative to the unbaffled air gap region. An additional circumferential flow area around the solid baffle may be provided between the stator and the radially outer margin of the solid baffle.

When radially inner and outer circumferential flow areas around the solid baffle are provided, axially flowing coolant gas, being urged by the fan, strikes the solid baffle and divides into a first and second portion. The first and second portion respectively flow through the radially inner and outer circumferential flow area around the solid baffle and ultimately recombine in the gap region on the downstream side of the solid baffle.

Immediately axially downstream the solid baffle, coolant gas flow is at relatively high velocity, causing a localized reduction, or vena contracta, in static pressure of coolant gas in the gap region. Further axially downstream the solid baffle, at an axial distance from the solid baffle which depends in part on the respective velocities of the first and second flow portions of coolant gas around the solid baffle and on the radial aspect ratio of the solid baffle to coolant flow, coolant flow within the gap region becomes diffused, with a resulting increase in static pressure in the gap region. It is static pressure, or more precisely the difference in static pressure between the gap region and the housing region circumferentially surrounding the radially outer periphery of the stator, that is the principle factor causing coolant gas to flow from the gap region to the housing region through stator core ventilating ducts.

Due to relatively high velocity flow of coolant gas downstream the solid baffle and corresponding reduction in static pressure of coolant gas in the gap region, it is believed that some stator core ventilating ducts, especially stator core ventilating ducts immediately downstream the solid baffle, are being starved of, or have inadequate flow of, coolant gas. It is further believed that lack of adequate coolant gas flow in stator core ventilating ducts causes groups of the plurality of stator laminations, which define ventilating ducts having inadequate coolant gas flow, to become overheated, resulting in inefficient machine operation and limiting the maximum power output deliverable by the generator.

In addition, at axial ends of the stator, where the gap region communicates with the generator end spaces, there is a tendency for coolant gas flow to bypass several stator ventilation ducts and thus not be as effective for purposes of cooling. This bypass is due to the relatively high axial component of coolant gas flow resulting from the axial discharge of coolant gas from the generator fan, through the restricted flow areas around the solid baffle at the entrance to gap region. High axial flow velocity in the gap region produces a "venturi effect", or region of low static pressure, at entrances to stator ventilation ducts disposed at the radially inner portion of the stator core in the stator end section.

The groups of laminations defining stator ventilating ducts in the end core region of the stator are exposed to the most severe temperature environment within the machine due to heat build up caused by magnetic flux coupling from the rotor in two directions, radially and axially, the axial portion due to stray or leakage magnetic flux in the generator end turn region. Cooling of the stator end core region thus merits special attention to ensure that adequate coolant gas flow is provided to the end core region and to ventilation ducts disposed therein.

It is thus desirable to provide a method and means for raising the localized static pressure of coolant flow within the gap region so as to more effectively motivate coolant gas flow through stator ventilation ducts, especially those ducts disposed in the end core region of the stator.

Fixtures of various configurations have been described for use in the gap region of a gas cooled dynamoelectric machine for controlling the flow of coolant gas. These fixtures usually require bolting and/or tying, such as to a slot wedge, for mechanical support. The fixtures and support means may be costly, labor intensive and involve many parts, and further, may require removal of the rotor from the machine in order to install them. It might also be possible to achieve coolant flow control by attaching a flow directing device, such as a partition, on the rotor. However, embodiments using devices attached to the rotor require rotation of the device along with ability to withstand stresses caused by the rotation. Further, such rotating devices may require labor intensive installation, such as removal of the rotor.

A baffle for a dynamoelectric machine is described and claimed in U.S. Pat. No. 3,413,499—Barton, which is assigned to the assignee of the present application. The baffle of the Barton patent includes a first portion affixed to and extending radially inward from the stator end block, a second portion affixed to the first portion and axially extending along the gap region past several stator outlet passages, and a third portion affixed to the second portion and extending radially outward toward the stator. Thus, the baffle of the Barton patent essentially creates a plenum chamber which is isolated from the gap region. The plenum chamber has an input in gas flow communication with the generator end space region and outputs in gas flow communication with inputs to stator outlet ducts which it surrounds. The cantilever type configuration of the baffle of the Barton patent (i.e. non-mechanical fixed support of the axially inward end of the second and of the third portion of the baffle) may not be desirable, due to potential excessive response to vibration, and further due to coolant flow leakage between the third portion of the baffle and the stator, which would result in a lower pressure within the plenum chamber and ultimately less coolant gas flow through the endmost stator cooling passages.

Other baffle configurations for the gap region of a gas cooled dynamoelectric machine are described in U.S. Pat. Nos. 4,051,400—Armor et al and 4,264,834—Armor et al, both assigned to the assignee of the present application. The baffle of the Armor et al ('400) patent is for a reverse flow cooled dynamoelectric machine, (i.e. coolant gas flow is from gap region into end space region of machine) wherein even if it were to be used in the forward flow configuration, it would not resolve the problems of the aforementioned solid baffle, such as excessive vena contracta within the gap region. The baffle of the Armor et al ('834) patent is used to divide the air gap region into a predetermined number of zones, and to prevent coolant gas flow leakage between the resulting zones, by providing a radial blockage or seal across the axial coolant gas flow path.

Accordingly, it is an object of the present invention to provide a method and apparatus for ensuring adequate coolant gas flow through stator ventilating ducts of a gas cooled dynamoelectric machine, particularly through those ducts disposed in the stator end core region.

Another object is to provide a method and apparatus for controlling the quantity of coolant gas flow entering the gap region of a gas cooled dynamoelectric machine without need to remove the rotor.

Still another object is to provide apparatus for directing flow of coolant gas in the gap region of a gas cooled dynamoelectric machine which is easily installed and does not require many parts.

Yet another object is to provide a method and apparatus for obtaining faster static pressure recovery for coolant gas flow in the gap region than is possible using known baffle configurations.

SUMMARY OF THE INVENTION

In accordance with the present invention, a baffle for a gas cooled dynamoelectric machine or generator comprises a perforate member defining at least one gas flow path through the member for providing gas flow communication between the end space region and the gap region of the generator. The perforate member preferably is spaced from and arcuately surrounds the rotor of the generator, and defines a plurality of gas flow paths therethrough arranged in a predetermined array. The gas flow paths may be disposed to provide a resultant velocity to gas flowing therethrough from substantially parallel to the axis of rotation of the rotor of the generator to about a radially outward angle of 30° with respect to axis of rotation. The size of the gas flow paths through the perforate member are predeterminedly selected to coordinate and optimize coolant gas flow through the baffle with coolant gas flow around the baffle for providing radially diffused coolant gas flow downstream the baffle.

Further, a method for controlling flow of coolant gas in a gas cooled dynamoelectric machine, or generator, comprises directing a flow of coolant gas from an end space region into the gap region of the generator and disposing perforate means, defining at least one gas flow path therethrough, between the air gap region and the end space region, whereby radially diffused coolant gas flow downstream the perforate means ensures adequate coolant gas flow to stator ventilating ducts of the generator. Coolant gas may be directed radially outward when leaving the perforate means at an angle up to about 30° with respect to the axis of rotation of the rotor of the generator.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

BRIEF DESCRIPTION OF THE DRAWING

FIG. 1 is an elevation view, partially in section, of part of a gas cooled dynamoelectric machine in accordance with the present invention.

FIG. 2 is an elevation view, partly in section, of an end portion of the machine of FIG. 1, drawn to an enlarged scale.

FIG. 3 is an elevation view of the stator end core region of the machine of FIG. 2 drawn to an enlarged scale, including an embodiment of a baffle in accordance with the present invention.

FIG. 4 is a partial axial view of the machine of FIG. 3, looking in the direction of the arrows of line 4—4 of FIG. 3.

FIG. 5 is an elevation view of the stator end core region of the machine of FIG. 2 drawn to an enlarged scale, including another embodiment of a baffle in accordance with the present invention.

FIG. 6 is a partial axial view of the machine of FIG. 5, looking in the direction of the arrows of line 6—6 of FIG. 5.

DETAILED DESCRIPTION

Referring to FIGS. 1 and 2 of the drawing, a dynamoelectric machine, or generator 10, includes a rotor 20 rotatably disposed within stator 30 which is spaced from and circumferentially surrounds rotor 20, and a suitable gas tight casing, or housing 11, enveloping both rotor 20 and stator 30 and pressurized with a coolant gas, such as hydrogen. Throughout this specification like reference numerals designate like components. The circumferential volume between rotor 20 and stator 30 is designated gap region 40. Rotor 20 rotates about axis of rotation 25 and has a fan 65 affixed to at least one axial end to rotate therewith. A retaining ring 22 is mounted over the ends of rotor 20 in order to maintain the end turn portion of the rotor windings in their desired orientation. Stator 30 comprises a core formed from a plurality of stacked laminations assembled in packages or groups 39. Details and reasons for stacked laminations at the end of the stator core are discussed in U.S. Pat. No. 3,714,477 to Gott, assigned to the instant assignee.

Axially spaced in discrete groups along rotor 20 are gap pickup holes 26 and gap discharge holes 24. These groups of holes are in substantial correspondence with similar groups in stator 30. That is, axially spaced, radially extending stator inlet passages, or ducts 34, are in substantial axial alignment with rotor gap pickup holes 26, and axially spaced, radially extending stator outlet passages, or ducts 32, are in substantial axial alignment with rotor gap discharge holes 24. Radially outward stator 30 in housing region 14, coolant gas entering inlet passages 34 is segregated from coolant gas discharging from outlet passages 32 by partitions 12, which in part define gas flow circuits for coolant gas to and from rotor fan 65. As shown in FIG. 1, rotor fan 65 receives gas from gas cooler 17 and discharges axially inwardly into end space region 60 toward gap region 40. A portion of coolant gas flow from fan 65 enters the interior of rotor 20 from beneath retaining ring 22 where it is effective to cool the end turn region and end windings (not shown) of rotor 20. Coolant gas flowing under retaining ring 22 subsequently radially discharges, at least in part, from gap discharge holes 24 of rotor 20.

Lamination groups of stator 30, indicated for example as 39a, 39b and 39c of FIG. 2, typically comprise a predetermined number of laminations. Each group of laminations is axially spaced from adjacent groups of laminations to define radially and circumferentially or arcuately extending stator coolant ducts, such as indicated at 32a, 32b, 32c, for providing gas flow communication between gap region 40 and generator housing region 14 (FIG. 1). The axially outer first group of laminations 39a, typically includes a plurality of steps, or radially inwardly increasing segments 33, which may be fabricated from radially foreshortened laminations, for providing a predetermined magnetic flux linkage path between rotor 20 and stator 30 in order to minimize undesirable heating effects of magnetic end flux leakage. An outside space block, or stator end block 35, which may comprise a non-magnetic steel, circumferentially surrounds rotor 20 and abuts first lamination group 39a.

In a known configuration, a solid baffle offering a gas impervious profile to axial gas flow between end space region 60 and gap region 40 is affixed to outside space block 35, radially extends into air gap region 40 and is spaced from retaining ring 22 of rotor 20. The solid baffle is positioned such that a radially inner passage, between the solid baffle and retaining ring 22, and a radially outer passage, between the solid baffle and outside space block 35, permit the flow of gas from fan 65 which impinges on the solid baffle to be divided into a radially inner and radially outer flow path around the solid baffle. Coolant gas flow accelerates as it passes through the radially inner and outer flow paths, due to throttling, which results in a localized decrease in static pressure in gap region 40 immediately axially downstream the solid baffle as hereinbefore described.

Referring to FIG. 3, the end core region of stator 30, including a baffle 70, in accordance with the present invention, is shown in an enlarged scale. Baffle 70 comprises a perforate member having holes or passages 75 therethrough for creating at least one gas flow path to permit unimpeded gas flow communication between end space region 60 and gap region 40. Baffle 70 includes support means 90, such as a hole that is defined by an inner surface of baffle 70, for securing baffle 70 to stator 30, and baffle 70 is mounted by fastening means 17, such as a nut and bolt, which cooperates with support means 90, on fingers, or teeth 37, which are predeterminedly circumferentially spaced and radially inwardly extend from outside space block 35, such that baffle 70 is disposed between end space region and gap region 40. Fingers 37 may be integral with outside space block 35. Alternatively, fingers 37 may be replaced by an annular flange (not shown), especially when coolant gas flow around the outer radial margin of baffle 70 is not desired. Baffle 70 may be formed from a continuous annular member, or may comprise a plurality of arcuate segments (a typical one of which is illustrated in FIG. 4) that when mounted to outside space block 35 form an annular baffle. By forming baffle 70 from a plurality of arcuate segments, ease of installation within generator 10 may be enhanced. Whether baffle 70 is formed from a continuous annular member or from a plurality of arcuate segments, baffle 70 may be installed within generator 10 without removing rotor 20.

Baffle 70 may be formed from any suitable material which can withstand the pressure forces associated with the flow of coolant gas. In a presently preferred embodiment, baffle 70 is formed from an electrically non-conducting substance, such as a laminated fiber material sold under the trademark Textolite, available from the General Electric Company, Schenectady, N.Y. Such materials prevent any induced heating in the baffle which might otherwise result from the high concentration of stray flux in the end region of the generator.

As shown more clearly in FIG. 4, holes 75 of baffle 70 may preferably be arranged in a predetermined array for ease of manufacture and for ensuring a predetermined rapid diffusion of a plurality of discrete coolant gas flow paths downstream baffle 70 in gap region 40 from an axial end thereof. Baffle 70 is shown spaced from the main body of outside space block 35 to form a coolant gas path extending from end space region 60 to gap region 40 over the outward radial margin of baffle 70 and between fingers 37. Alternately, baffle 70 may be positioned with respect to outside space block 35 such that coolant gas flow past the outer radial margin of baffle 70 is inhibited, and the size, spacing and disposition of holes 75 of baffle 70 may be selected to provide desirable coolant flow axially downstream baffle 70.

From a study of fluid dynamics, it can be shown that the axial extent of the vena contracta past a baffle (i.e. the axial extent of the region downstream the baffle in which the static pressure of coolant gas is below the average static pressure of coolant gas at a relatively large distance axially downstream the baffle, say ten times the radial aspect of the baffle) is about six times the spacing between adjacent flow paths, and that the total throttling achieved by a baffle is proportional to the total available gas flow area past the baffle. Static pressure is recovered downstream the baffle due to radial diffusion of coolant gas emanating from coolant flow streams around the baffle. In accordance with the present invention, by distributing the total available gas flow area when a solid baffle is used, among a plurality of spaced holes 75 through baffle 70, the same pressure drop or throttling effect as from a solid baffle is maintained, while the spacing between adjacent gas flow paths 75 and coolant gas jets emanating therefrom is decreased. Thus, the axial extent of the vena contracta past baffle 70 is reduced, since the recovery to the average static pressure is about six times the spacing between holes 75. The size and spacing of holes 75 for a particular application may thus be readily determined by one skilled in the art without undue experimentation.

The size and spacing of holes 75 should be selected such that coolant gas flow through holes 75 cooperates with coolant gas flow around the inner radial margin, and, if present, with coolant gas flow around the outer radial margin of baffle 70, to provide substantially diffused flow in gap region 40 downstream baffle 70. To increase gas flow through hole 75 of baffle 70, without increasing the exit diameter or flow area of holes 75 and thereby increasing dispersion of coolant gas exiting from holes 75, the input margin of holes 75 may be increased, such as by chamfering or countersinking 77.

Holes 75, as shown in FIGS. 3 and 4, may be substantially cylindrical, having a longitudinal axis substantially parallel to the axis of rotation 25 (FIG. 1) of rotor 20. Center to center spacing between adjacent holes 75 is preferably symmetrical so that a uniform predetermined circumferentially extending coolant gas flow pattern exiting baffle 70 is obtained. Although cylindrical holes 75 are shown, holes 75 may assume any shape consistent with establishing rapid radial diffusion of coolant gas flow in gap region 40 in order to achieve desired coolant flow distribution axially downstream baffle 70.

When arranged in an array, the centers of holes 75 may be conveniently disposed on a circle. In addition, a plurality of radially spaced or concentric circles may be used to locate holes 75, such that a plurality of circumferentially extending rows of holes 75 are obtained. In a preferred embodiment, the chordic spacing between centers of adjacent cylindrical holes 75 disposed on a circle is twice the diameter of holes 75. Thus diameters of holes 75 may be, for example, 10/32 inches with a chordic spacing of 20/32 inches. Further, adjacent concentric circles for locating the centers of holes 75 are preferably radially spaced at a distance equal to the hole diameter or 10/32 inches for the above example. In addition, as shown more clearly in FIG. 4, the centers of holes 75 on a center locating circle may be staggered or disposed circumferentially intermediate the centers of holes 75 on adjacent center locating circles. The center of circles for locating holes 75 may be the axis of rotation 25 (FIG. 1) of rotor 20.

Referring to FIGS. 5 and 6, the end core region of stator 20, including a more preferred baffle 80, in accordance with the present invention, is shown in an enlarged scale. Baffle 80 is substantially similar to baffle 70, except for the orientation of holes or passages 85 therethrough, and all previous remarks with respect to composition, manufacture and disposition of baffle 70 apply equally as well to baffle 80. Holes 85, defined by interior surfaces of baffle 80, are disposed to provide a radially outward component to gas flow as coolant gas passes therethrough from end space region 60 to gap region 40 and for creating at least one gas flow path to permit unimpeded gas flow communication between end space region 60 and gap region 40. Holes 85 may be substantially cylindrical and arranged through baffle 80 such that the longitudinal axis is disposed at an angle 82 with respect to reference line 84. Reference line 84 is substantially parallel to axis of rotation 25 (FIG. 1) of rotor 20. For ease of manufacturing baffle 80, reference line 84 may also be designated as substantially perpendicular to surface 81 or surface 83 of baffle 80, since surfaces 81 and 83 should generally be flat and parallel so as to avoid imparting undesirable gas flow components to coolant gas impinging thereon. Also, the upstream surface of fingers 37 should be generally flat and radially extending so that when baffle 80 is secured thereto, baffle 80 is substantially radially disposed between gap region 40 and end space region 60. Although cylindrical holes 85 are shown, holes 85 may assume any shape consistent with establishing rapid radial diffusion of coolant gas flow in gap region 40 in order to achieve desired coolant flow distribution axially downstream baffle 80. The input margin of holes 85 may be increased, such as by chamfering or countersinking 87.

Using test apparatus, including water to simulate coolant gas flow from end space region 60 to gap region 40 past perforated baffles 70 (FIG. 3) and 80 in accordance with the present invention, it was found that holes 75, having a substantially axial orientation, improved coolant gas flow through stator ducts, especially through outlet ducts 32a and 32b, over coolant gas flow obtained when a solid baffle was used. It was also determined that increasing angle 82 to about 30°, for imparting an outward radial velocity component of flow to coolant gas passing through holes 85 and thereby producing a resultant velocity (i.e. vector sum of axial and radial velocity components) on coolant gas exiting holes 85 having an outward radial direction, further increased coolant gas flow through stator ducts, especially through outlet ducts 32a and 32b. However, angle 82 should not be increased beyond the angle which causes the most radially outer holes 85 of baffle 80 (i.e. the top row of holes 85 of FIG. 6) to direct coolant gas or jets onto step laminations 33 of stator lamination group 39a. To help envision this constraint, a reference line 86 is shown between the radially outermost margin of the exit of radially outermost hole 85 and the intersection of the most axially downstream lamination step 33 with the radially inner surface 38 of the radially innermost portion of stator lamination group 39a. No coolant gas exiting from holes 85 of baffle 80 should enter the region upstream, or axially and radially outward, reference line 86. Because of the desirability to avoid directing coolant gas onto steps 33, holes 85 will generally not extend radially outwardly as far over baffle 80 as will holes 75 over baffle 70.

It is not necessary that all holes 75 or 85 direct coolant gas exiting therefrom in the same direction relative to the axis of rotation 25 (FIG. 1) of rotor 20, but only that total coolant gas flow rate and direction imparted to coolant gas when exiting holes 75 or 85 be coordinated with total coolant gas flow rate and direction of coolant gas flowing around the radial inner (and outer, if present) margin of baffle 70 and 80, respectively, that is, the total coolant gas flow area through holes 75 or 85 and around the radial inner (and outer, if present) margin of baffle 70 or 80, respectively, is predeterminedly selected, for ensuring rapid radial diffusion of coolant gas flow in gap region 40 downstream baffle 70 or 80, respectively, thereby obtaining faster recovery of static pressure of coolant gas over known baffles. Further, baffle 70 (FIG. 3) may be disposed at an angle (not shown) with respect to axis of rotation 25 (FIG. 1) of rotor 20 so that holes 75 would direct coolant gas radially outward with respect to axis of rotation 25. That is, baffle 70 would be disposed such that the radial inner portion of baffle 70 is further axially downstream than the radial outer portion of baffle 70 (i.e. baffle 70 may be similar to a frustum of a cone). Fingers 37 (FIG. 3) or a flange (not shown) would be modified accordingly to provide adequate support for baffle 70.

Thus has been illustrated and described a method and apparatus for ensuring adequate coolant gas flow through stator ventilating ducts of a dynamoelectric machine, particularly those ducts disposed in the stator end core region. The method and apparatus permit control of coolant gas flow without having to remove the rotor and the apparatus is easily installed and does not require many parts. Further, the method and apparatus obtain faster recovery of static pressure of coolant gas over known baffles.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A method for controlling flow of coolant gas from an end space region to a gap region of a gas cooled dynamoelectric machine, said machine including a rotor having an axis rotation and a stator speced from and circumferentially surrounding the rotor for forming the gap region therebetween, the gap region having an axial end and the stator including a stator ventilating duct in gas flow communication with the gap region, comprising the steps of:

directing a flow of coolant gas from the end space region of the machine into the gap region at the axial end of the gap region;

dividing the flow of coolant gas entering the axial end of the gap region into a plurality of discrete gas flow paths, such that unimpeded gas flow communication between the end space region and the gap region is maintained through the gas flow paths; and diffusing the plurality of discrete gas flow paths at a predetermined distance into the gap region from the axial end of the gap region.

whereby rapid radial diffusion of coolant gas flow downstream the axial end of the gap region ensures adequate coolant gas flow to said stator ventilating duct.

2. The method as in claim 1, wherein the step of dividing further includes disposing at least one of the plurality of discrete flow paths to impart an outward radial velocity component of flow to coolant gas passing through said at least one of the plurality of discrete flow paths.

3. The method as in claim 2, wherein the resultant output velocity direction of coolant gas passing through said at least one gas flow path is greater than 0° to about 30° with respect to the axis of rotation of the rotor.

4. The method as in claim 2, wherein the stator further includes a group of a predetermined number of laminations having stepped laminations and further wherein disposing said at least one of the pluraltiy of discrete flow paths includes directing coolant gas exiting said at least one of the plurality of discrete flow paths for ensuring that coolant gas passing through said at least one of the plurality of discrete flow paths avoids impinging the stepped laminations.

5. The method as in claim 2 , wherein disposing at least one of the plurality of discrete flow paths includes directing each of the plurality of discrete flow paths to impart a respective outward radial velocity component of flow to coolant gas passing through each of said plurality of discrete flow paths, respectively.

6. The method as in claim 1, wherein the step of dividing further includes disposing said plurality of discrete gas flow paths in a predetermined array.

7. The method as in claim 5, further including forming a first gas communication path between the plurality of discrete flow path and the rotor, and coordinating the size of the plurality of discrete flow paths and the size of the forst gas communication path for ensuring substantially diffused coolant gas flow in the gap region immediately downstream the axial end of the gap region.

8. The method as in claim 7, further including forming a second gas communication path between the plurality of discrete flow paths and the stator, and the step of coordinating further includes arranging the size of the second gas communication path for ensuring substantially diffused coolant gas flow in teh gap region immediately downstream the axial end of the gap region.

9. In a gas cooled dynamoelectric machine including a rotor having an axis of rotation and a stator, the stator spaced from and circumferentially surrounding the rotor for forming a gap region therebetween, the machine further including means for urging flow of coolant gas from an end space region into the gap region, the stator including a stator ventilating duct having an inlet in gas flow communciation with the gap region, a baffle comprising:

perforate means having an interior surface for defining at least one gas flow path therethrough, said perforate means for providing unimpeded gas flow communication between the end space region and the gap region through the at least one gas flow path; and support means coupled to said perforate means for securing said perforate means to the stator such that the perforate means is disposed between the end space region and the gap region.

10. The baffle as in claim 9, wherein said perforate means includes an annular member spaced from and circumferentially surrounding the rotor.

11. The baffle as in claim 9, wherein the output of the at least one gas flow path is disposed for imparting a resultant gas flow velocity substantially parallel to the axis of rotation of the rotor to coolant gas flowing through the at least one gas flow path.

12. The baffle as in claim 11, wherein the at least one gas flow path is cylindrical and the longitudinal axis of the at least one gas flow path is substantially parallel to the axis of rotation of the rotor.

13. The baffle as in claim 9, wherein the output of the at least one gas flow path is disposed for imparting a radial outward gas flow velocity component to coolant gas flowing through the at least one gas flow path.

14. The baffle as in claim 13, wherein the at least one gas flow path is cylindrical and the longitudinal axis of the at least one gas flow path is disposed at an outward radial angle with respect to the axis of rotation of the rotor.

15. The baffle as in claim 13, wherein the output of the at least one gas flow path is further disposed for imparting a resultant gas flow velocity to coolant gas flowing through the at least one gas flow path of up to about 30° with respect to the axis of rotation of the rotor.

16. The baffle as in claim 14 wherein the longitudinal axis of the at least one gas flow path is furthe disposed at an outward radial angle less than about 30° with respect to the axis of rotation of the rotor.

17. The baffle as in claim 13, wherein the stator further includes a group of a predetermined number of laminations having stepped laminations and the output of the at least one gas flow path is further disposed for ensuring that coolant gas passing through said at least one gas flow path is directed so as to avoid having gas exiting the at least one gas flow path impinge the stepped laminations.

18. The baffle as in claim 17, wherein the at least one gas flow path is cylindrical and further wherein an extension of the radially outermost margin of the output of the at least one gas flow path intersects the stator axially downstream the stepped laminations.

19. The baffle as in claim 9, wherein the baffle is formed from an electrically non-conducting material.

20. The baffle as in claim 19, wherein the electrically non-conducting material is a laminated fiber material.

21. The baffle as in claim 10, wherein said annular member is formed from a plurality of arcuate segments for ease of installation.

22. The baffle as in claim 9, wherein the at least one gas flow path includes an input and an exit, the input having a larger gas flow area than the exit.

23. The baffle as in claim 10, wherein said perforate means includes a plurality of interior surfaces for defining a respective plurality of gas flow path therethrough.

24. The baffle as in claim 23, wherein the plurality of gas flow paths are disposed in a predetermined array.

25. The baffle as in claim 24, whrein the centers of the inputs and exits of the plurality of gas flow paths are respectively located on a circle intersecting the baffle.

26. The baffle as in claim 24, wherein a respective first and second portion of the centers of the inputs and exits of the plurality of gas flow paths are respectively disposed on concentric first and second circles, respectively.

27. The baffle as in claim 25, wherein the plurality of gas flow paths are cylindrical.

28. The baffle as in claim 23, wherein said baffle is spaced from the rotor to define a first gas communication path between the end space region and the gap region, said first gas communication path disposed between the rotor and the baffle, and the size of the total coolant gas flow area through the plurality of gas flow paths and through the first gas communication path is predeterminedly selected for ensuring substantially diffused coolant gas flow in the gap region downstream the baffle.

29. The baffle as in claim 28, wherein said baffle is further spaced from the stator to define a second gas communication path between the end space region and the gap region, said second gas communication path disposed between the baffle and the stator, and the size of the second gas communication path is predeterminedly slected for ensuring substantially diffused coolant gas flow in the gap region downstream the baffle.

30. A baffle for controlling coolant gas flow in a dynamoelectric machine, the machine including a stator spaced from and circumfentially surrounding a rotatably mounted rotor to form a gap region therebetween, an end space region and fan means for urging coolant gas from the end space region to the gap region, comprising:
perforate means having a plurality of interior surfaces for defining a respective plurality of gas flow paths therethrough, said perforate means for providing unimpeded gas flow communication between the end space region and the gap region through the plurality of gas flow paths; and
support means coupled to said perforate means for securing said perforate means to the stator such that said perforate means is disposed between the end space region and the gap region.

31. The baffle as in claim 30 wherein said perforate means includes an annular member.

32. The baffle as in claim 31 wherein said annular member is formed from a plurality of arcuate segments for ease of installation.

33. The baffle as in claim 30, wherein at least one of the plurality of gas flow paths includes an input and an exit, the input having a larger gas flow area than the exit.

34. The baffle as in claim 30, wherein the plurality of gas flow paths are disposed in a predetermined array.

35. The baffle as in claim 31, wherein the plurality of gas flow paths are disposed in a predetermined array.

36. The baffle as in claim 30, wherein the plurality of gas flow paths are cylindrical.

37. The baffle as in claim 30, wherein the baffle is formed from an electrically non-conducting material.

38. The baffle as in claim 9, wherein the dynamoelectric machine further includes an outside space block coupled to the stator and further wherein the baffle is connected to the outside space block.

39. The baffle as in claim 38, wherein the baffle is bolted to the outside space block.

40. The baffle as in claim 30, wherein the dynamoelectric machine further includes an outside space block coupled to the stator and further wherein the baffle is connected to the outside space block.

41. The baffle as in claim 40, wherein the baffle is bolted to the outside space block.

42. The baffle as in claim 36, wherein the plurality of gas flow paths are disposed in a predetermined array.

43. The baffle as in claim 32, wherein at least one of the plurality of gas flow paths is directed to impart an outwardly radial gas flow velocity component to coolant gas flow through the at least one of the plurality of gas flow paths.

44. The baffle as in claim 26, wherein the plurality of gas flow paths are cylindrical.

45. The baffle as in claim 32, wherein the plurality of gas flow paths are disposed in a predetermined array.

46. The baffle as in claim 32, wherein the plurality of gas flow paths are cylindrical.

47. The baffle as in claim 46, wherein the plurality of gas flow paths are disposed for imparting a radial outward gas flow velocity component to coolant gas flowing through the plurality of gas flow paths.

* * * * *